United States Patent
Lee

(10) Patent No.: US 10,043,286 B2
(45) Date of Patent: Aug. 7, 2018

(54) APPARATUS AND METHOD FOR RESTORING CUBICAL OBJECT

(71) Applicant: ELECTRONICS AND TELECOMMUNICATIONS RESEARCH INSTITUTE, Daejeon (KR)

(72) Inventor: Joo-Haeng Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 18 days.

(21) Appl. No.: 15/260,587

(22) Filed: Sep. 9, 2016

(65) Prior Publication Data
US 2017/0069095 A1 Mar. 9, 2017

(30) Foreign Application Priority Data
Sep. 9, 2015 (KR) .......................... 10-2015-0127773

(51) Int. Cl.
*G06K 9/00* (2006.01)
*G06T 7/536* (2017.01)

(52) U.S. Cl.
CPC .................... *G06T 7/536* (2017.01)

(58) Field of Classification Search
None
See application file for complete search history.

(56) References Cited

U.S. PATENT DOCUMENTS 5,647,018 A * 7/1997 Benjamin ............. G06T 11/006
 250/398
6,963,824 B1 * 11/2005 Davidson ................ G06F 17/50
 342/442

(Continued)

FOREIGN PATENT DOCUMENTS

KR 10-1998-0004174 A1 3/1998
KR 10-2011-0070678 A1 6/2011
KR 10-2013-0114420 A1 10/2013

OTHER PUBLICATIONS

Youyi Zheng et al, "Interactive Images: Cuboid Proxies for Smart Image Manipulation" SIGGRAPH, 2012.

(Continued)

*Primary Examiner* — Nancy Bitar
(74) *Attorney, Agent, or Firm* — LRK Patent Law Firm

(57) ABSTRACT

An apparatus for restoring a cubical object includes: a vanishing point computing part configured to compute vanishing points corresponding to an image; an image depth computing part configured to compute an image depth of a cubical object in the image; a central rectangle computing part configured to compute a central rectangle based on a representative rectangle of the image and the vanishing points; a restored rectangle computing part configured to compute a restored rectangle corresponding to the central rectangle and a projection center point using a coupled line camera (CLC) method; a cube depth computing part configured to computed a restored cubical object depth based on the central rectangle, the restored rectangle and the projection center point; and a cube restoring part configured to restore a cubical object having the restored rectangle as one surface thereof and having a depth of the restored cubical object depth.

8 Claims, 11 Drawing Sheets

(56) References Cited

U.S. PATENT DOCUMENTS

| | | | | |
|---|---|---|---|---|
| 8,644,549 | B2* | 2/2014 | Foland | G06T 11/006 378/9 |
| 8,917,954 | B2 | 12/2014 | Kim et al. | |
| 9,922,437 | B1* | 3/2018 | Baron | G06T 11/60 |
| 2011/0064303 | A1* | 3/2011 | Winn | G06K 9/3233 382/159 |
| 2011/0149039 | A1 | 6/2011 | Kim et al. | |

OTHER PUBLICATIONS

Joseph J. Lim et al, "Parsing IKEA Objects: Fine Pose Estimation", ICCV, pp. 1-8, 2012.

* cited by examiner

APPARATUS AND METHOD FOR RESTORING CUBICAL OBJECT

CROSS-REFERENCE TO RELATED APPLICATION(S)

This application claims the benefit of Korean Patent Application No. 10-2015-0127773, filed with the Korean Intellectual Property Office on Sep. 9, 2015, the disclosure of which is incorporated herein by reference in its entirety.

BACKGROUND

1. Field of the Invention

The present invention relates to restoring a cubical object, more specifically to restoring a cubical object included in a single image.

2. Description of Related Art

Cubical objects are a geometric form that can be easily found in indoor and outdoor scenes. For example, most buildings and furniture take cubical forms.

The geometric information of cubical environment/object has become increasingly important with the advent of smartphones, augmented reality, virtual reality and robot navigation.

Restoring a three-dimensional object from an image requires a pre-calibrated camera or a measuring device based on a specialized camera or laser for restoration of cubical objects. For instance, an expensive measuring device is used in a device for automatically configuring a map through a large capacity image.

Moreover, in the conventional methods of restoring a geometric cube, it is required that camera calibration is performed first. That is, in the conventional methods of restoring a cubical object, pre-calculated internal factors of camera are utilized to extract geometric information from an image. In the case where the internal factors of camera are unknown, it is required to obtain peculiar features from a large amount of images, as in the PhotoSynth technology, in order to restore a cubical object. However, these conventional methods do not consider geometric conditions (e.g., each surface of the cubical object being a rectangle and two surfaces of the cubical object forming a right angle) and thus may not properly restore the cubical object.

SUMMARY

The present invention provides an apparatus and a method for restoring a cubical object included in a single image through an operation having a low computational complexity without performing camera calibration.

An aspect of the present invention provides an apparatus for restoring a cubical object, which includes: a vanishing point computing part configured to compute vanishing points corresponding to an image; an image depth computing part configured to compute an image depth of a cubical object in the image; a central rectangle computing part configured to compute a central rectangle based on a representative rectangle of the image and the vanishing points; a restored rectangle computing part configured to compute a restored rectangle corresponding to the central rectangle and a projection center point using a coupled line camera (CLC) method; a cube depth computing part configured to computed a restored cubical object depth based on the central rectangle, the restored rectangle and the projection center point; and a cube restoring part configured to restore a cubical object having the restored rectangle as one surface thereof and having a depth of the restored cubical object depth.

The vanishing point computing part may be configured for: computing first vanishing points by intersecting lines extended from sides of the representative rectangle facing opposite to each other; computing a first line segment passing through a center point of the image and being perpendicular to a line segment connecting the first vanishing points with each other; computing a second line segment being perpendicular to a line segment extended from one of the first vanishing points through the center point and passing through the other of the first vanishing points; and computing a second vanishing point by intersecting the first line segment and the second line segment.

The image depth computing part may be configured for: computing a center point of a center-moved rectangle facing opposite to the central rectangle in a cubical object containing the central rectangle; computing a center vanishing point by intersecting a line extended through a center point of the representative rectangle from a center point of the central rectangle and a line segment connecting the first vanishing points; computing a center point of the center-moved rectangle by intersecting a line extended from the center vanishing point through a center point of a corresponding rectangle, which faces opposite to the representative rectangle, and a line extended from the second vanishing point to the center point of the central rectangle; and computing a vector corresponding to a line segment connecting from the center point of the central rectangle to the center point of the center-moved rectangle as an image depth.

The cube depth computing part may be configured for: disintegrating the image depth into two diagonal vectors of the central rectangle; converting the two diagonal vectors into two diagonal vectors of the restored rectangle; computing a depth of the restored rectangle by adding the two diagonal vectors of the restored rectangle with each other; and computing a restored cubical object depth based on the depth of the restored rectangle and the projection center point.

The cube depth computing part may be configured to compute a scalar value of the restored cubical object depth using the following equation and to generate the restored cubical object depth being perpendicular to the restored rectangle and having the scalar value, whereas $d_z$ is the scalar value of restored cubical object depth, $g_z$ being the restored cubical object depth, $d_r$ being a scalar value of the restored rectangle, $d_h$ being a horizontal distance between one vertex of the restored rectangle and the projection center point, and $d_v$ being a vertical distance between the one vertex of the restored rectangle and the projection center point.

Another aspect of the present invention provides a method of restoring a cubical object performed by an apparatus for restoring a cubical object. The method of restoring a cubical object in accordance with an embodiment of the present invention includes: computing vanishing points corresponding to an image; computing an image depth of a cubical object in the image; computing a central rectangle based on a representative rectangle of the image and the vanishing points; computing a restored rectangle corresponding to the central rectangle and a projection center point using a coupled line camera (CLC) method; computing a restored cubical object depth based on the central rectangle, the restored rectangle and the projection center point; and restoring a cubical object having the restored rectangle as one surface thereof and having a depth of the restored cubical object.

The step of computing the vanishing points corresponding to the image may include: computing first vanishing points by intersecting lines extended from sides of the representative rectangle facing opposite to each other; computing a first line segment passing through a center point of the image and being perpendicular to a line segment connecting the first vanishing points with each other; computing a second line segment being perpendicular to a line segment extended from one of the first vanishing points through the center point and passing through the other of the first vanishing points; and computing a second vanishing point by intersecting the first line segment and the second line segment.

The step of computing the image depth of the cubical object in the image may include: computing a center point of a center-moved rectangle facing opposite to the central rectangle in a cubical object containing the central rectangle; computing a center vanishing point by intersecting a line extended through a center point of the representative rectangle from a center point of the central rectangle and a line segment connecting the first vanishing points; computing a center point of the center-moved rectangle by intersecting a line extended from the center vanishing point through a center point of a corresponding rectangle, which faces opposite to the representative rectangle, and a line extended from the second vanishing point to the center point of the central rectangle; and computing a vector corresponding to a line segment connecting from the center point of the central rectangle to the center point of the center-moved rectangle as an image depth.

The step of computing the restored cubical object depth based on the central rectangle, the restored rectangle and the projection center point may include: disintegrating the image depth into two diagonal vectors of the central rectangle; converting the two diagonal vectors into two diagonal vectors of the restored rectangle; computing a depth of the restored rectangle by adding the two diagonal vectors of the restored rectangle with each other; and computing a restored cubical object depth based on the depth of the restored rectangle and the projection center point.

The step of computing the restored cubical object depth based on the depth of the restored rectangle and the projection center point may include: computing a scalar value of the restored cubical object depth using the following equation and generating the restored cubical object depth being perpendicular to the restored rectangle and having the scalar value, whereas $d_z$ is the scalar value of restored cubical object depth, $g_z$ being the restored cubical object depth, $d_t$ being a scalar value of the restored rectangle, $d_h$ being a horizontal distance between one vertex of the restored rectangle and the projection center point, and $d_v$ being a vertical distance between the one vertex of the restored rectangle and the projection center point.

As described above, according to an embodiment of the present invention, it is possible to restore a cubical object included in a single image of a camera that is not calibrated.

Moreover, according to an embodiment of the present invention, it is possible to restore a cubical object through an operation having a low computational complexity, by utilizing coupled line camera (CLC).

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

When one element is described to "transmit" or "send" a signal to another element, it shall be construed that the one element may be directly connected to the other element to transmit or send the signal, but it shall be also construed that, unless otherwise described, the one element may transmit or send the signal to the other element via yet another element.

Figure 1:
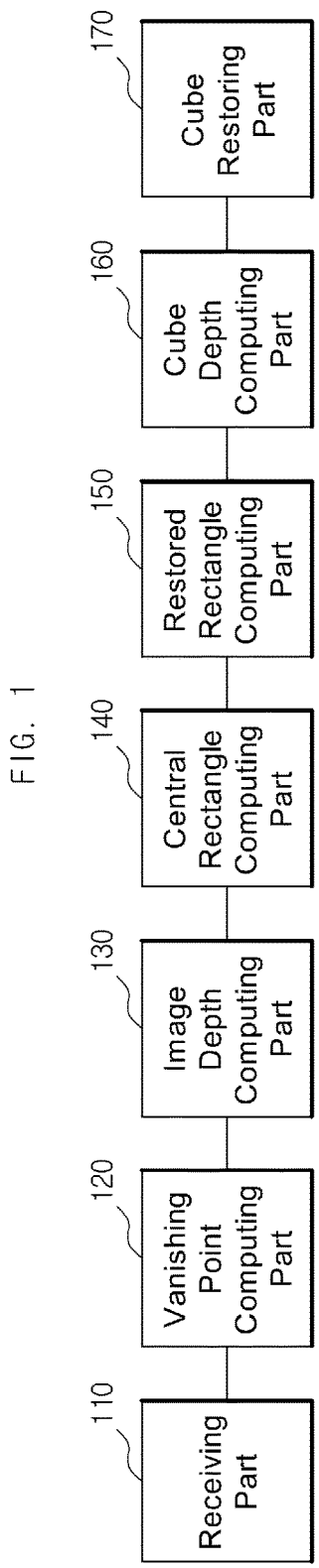
FIG. 1 illustrates an apparatus for restoring a cubical object in accordance with an embodiment of the present invention.

FIG. 1 illustrates an apparatus for restoring a cubical object in accordance with an embodiment of the present invention.

Referring to FIG. 1, an apparatus for restoring a cubical object in accordance with an embodiment of the present invention includes a receiving part 110, a vanishing point computing part 120, an image depth computing part 130, a central rectangle computing part 140, a restored rectangle computing part 150, a cube depth computing part 160 and a cube restoring part 170.

The receiving part 110 receives an image from an external device (e.g., a terminal, a camera, a storage, etc.) through a predetermined protocol. The receiving part 110 transmits the image to the vanishing point computing part 120.

The vanishing point computing part 120 selects a surface having the best visibility among surfaces of a cubical object in the image and designates the surface as a representative rectangle, and computes vanishing points corresponding to the cubical object in the image. The vanishing point computing part 120 transmits the vanishing points, the representative rectangle and the image to the image depth computing part 130. How the vanishing point computing part 120 computes the vanishing points will be described later in detail with reference to FIG. 2 and FIG. 4.

The image depth computing part 130 computes an image depth of the cubical object. Here, the image depth refers to a vector including a length and a direction of an edge connecting one vertex of the representative rectangle and one vertex of a corresponding rectangle, which is a rectangle facing the representative rectangle. How the image depth computing part 130 computes the image depth will be described later in detail with reference to FIG. 10 and FIG. 11.

The central rectangle computing part 140 computes a central rectangle corresponding to the representative rectangle. Here, the central rectangle is a rectangle deformed from the representative rectangle in such a way that a center point of the rectangle is positioned at a center point of the image. How the central rectangle computing part 140 computes the central rectangle will be described later in detail with reference to FIG. 12.

The restored rectangle computing part 150 computes a restored rectangle corresponding to the central rectangle and a projection center point using a coupled line camera (CLC) method. Here, the restored rectangle refers to a rectangle being one surface of a restored cubical object, and the projection center point refers to a position of a camera at which an image such as the central rectangle can be obtained when the restored rectangle is photographed.

The cube depth computing part 160 computes a depth of the restored cubical object based on the central rectangle, the restored rectangle and the projection center point. For example, the cube depth computing part 160 may disintegrate the image depth into two diagonal vectors of the central rectangle, convert the two diagonal vectors of the central rectangle into two diagonal vectors of the restored rectangle using the CLC property, compute a depth of the restored rectangle by adding the two converted vectors, and compute the depth of the restored cubical object (restored cubical object depth, hereinafter) according to geometric relations of the depth of the restored rectangle, the image depth and the projection center point.

The cube restoring part 170 restores a cubical object that includes the restored rectangle on one surface and has the restored cubical object depth as a depth thereof.

Figure 2:
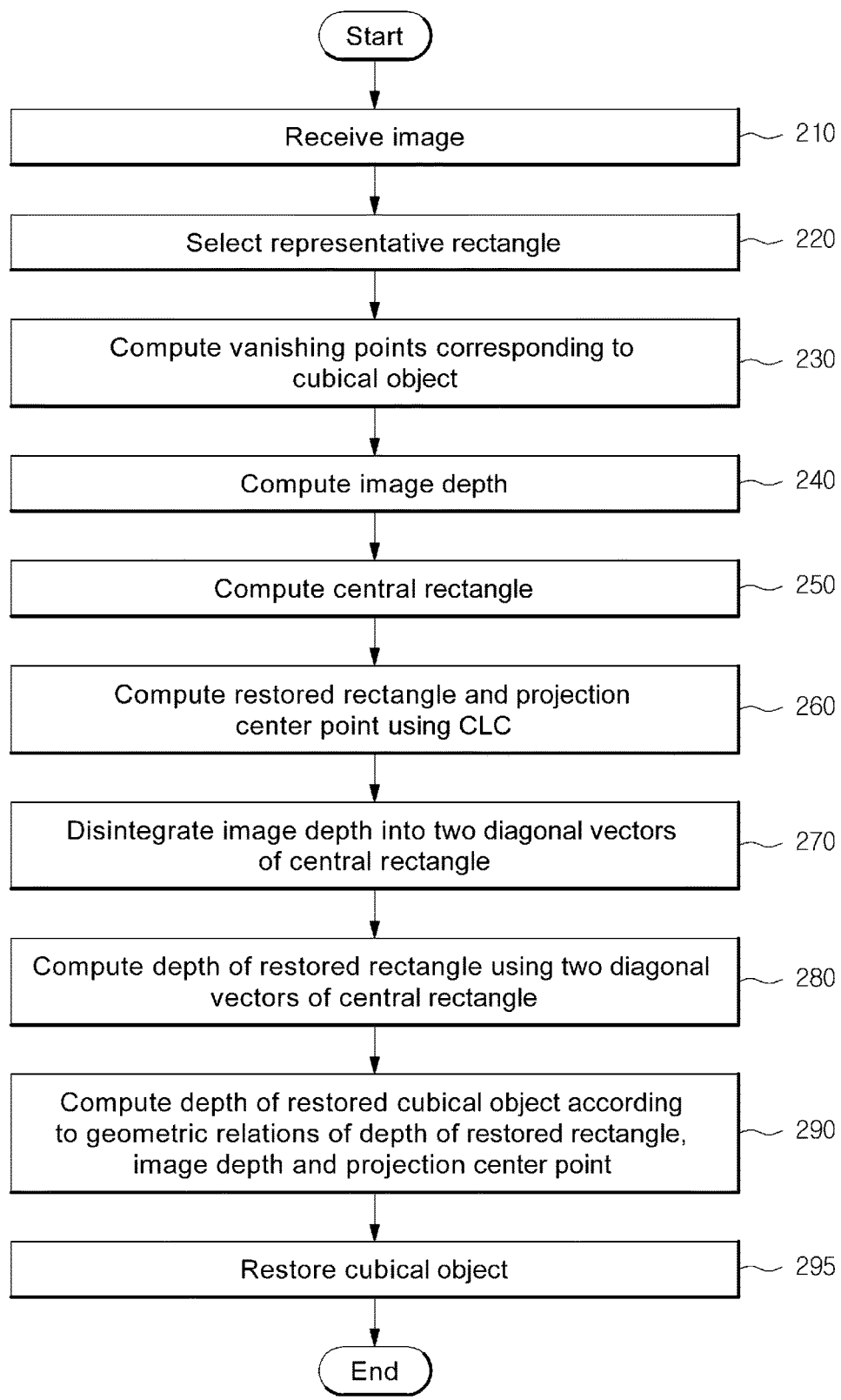
FIG. 2 illustrates how the apparatus for restoring a cubical object in accordance with an embodiment of the present invention restores a cubical object.
Figure 3:
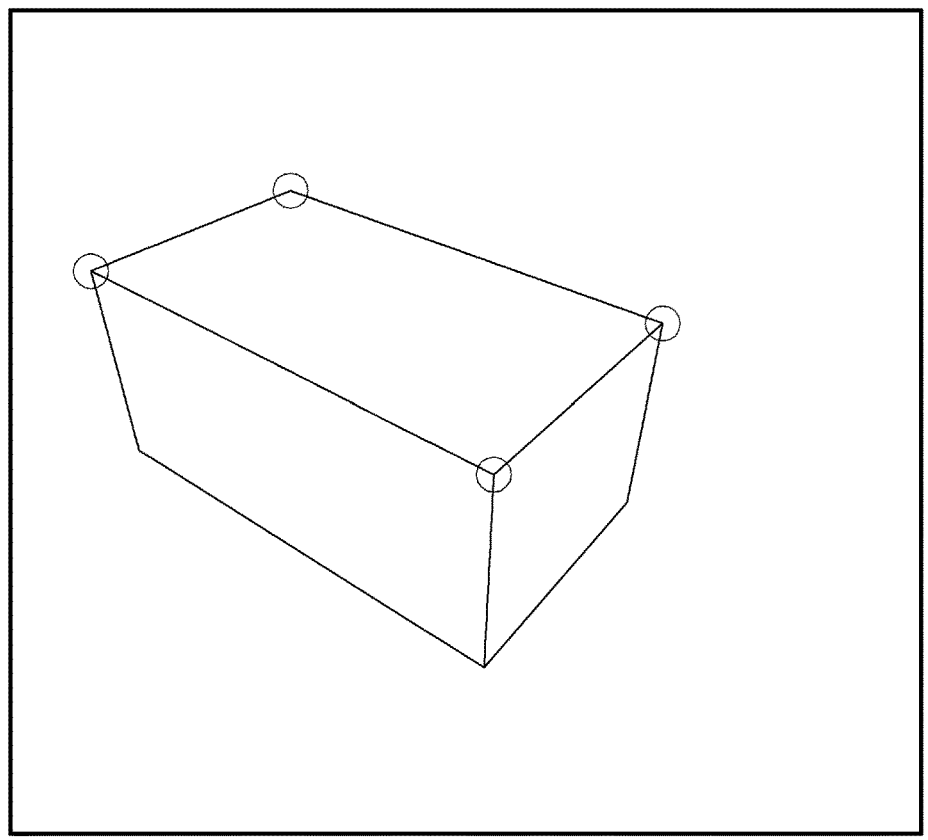
FIG. 3 illustrates a representative rectangle of a cubical object selected by the apparatus for restoring a cubical object in accordance with an embodiment of the present invention.
Figure 4:
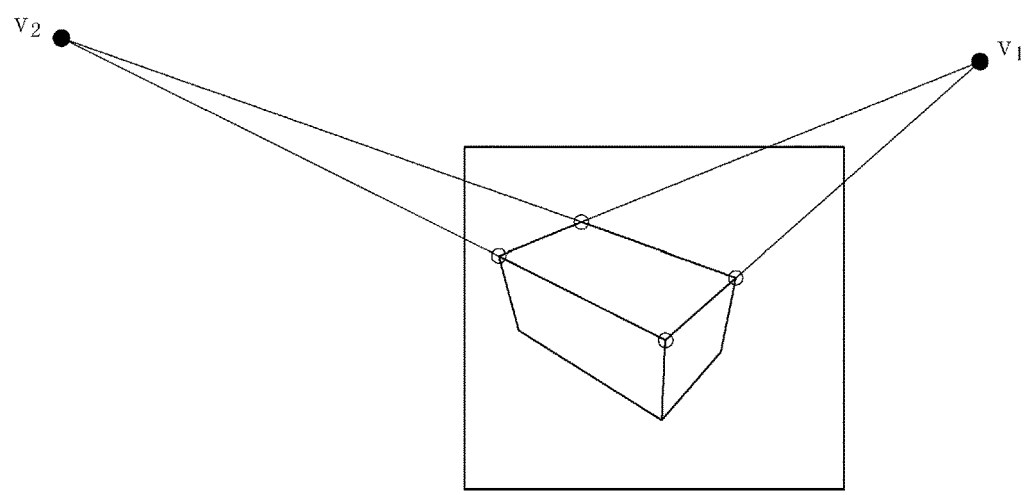
FIG. 4 illustrates how the apparatus for restoring a cubical object in accordance with an embodiment of the present invention computes two vanishing points.
Figure 5:
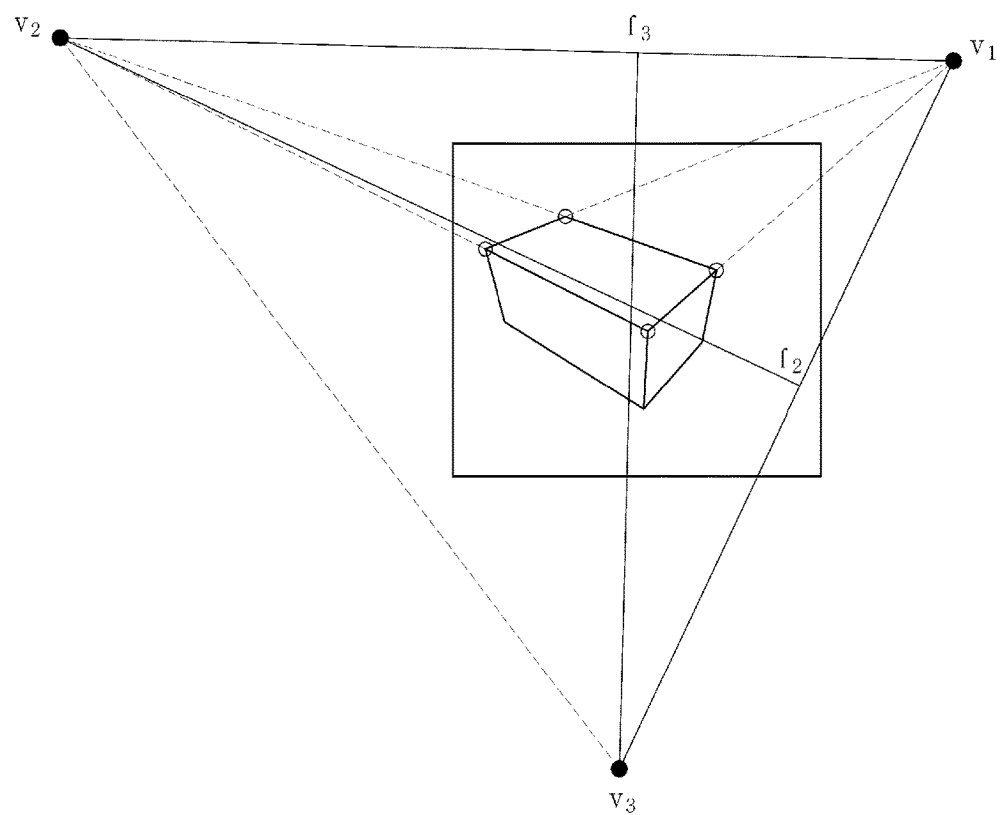
FIG. 5 illustrates how the apparatus for restoring a cubical object in accordance with an embodiment of the present invention computes a third vanishing point using the two vanishing points.
Figure 6:
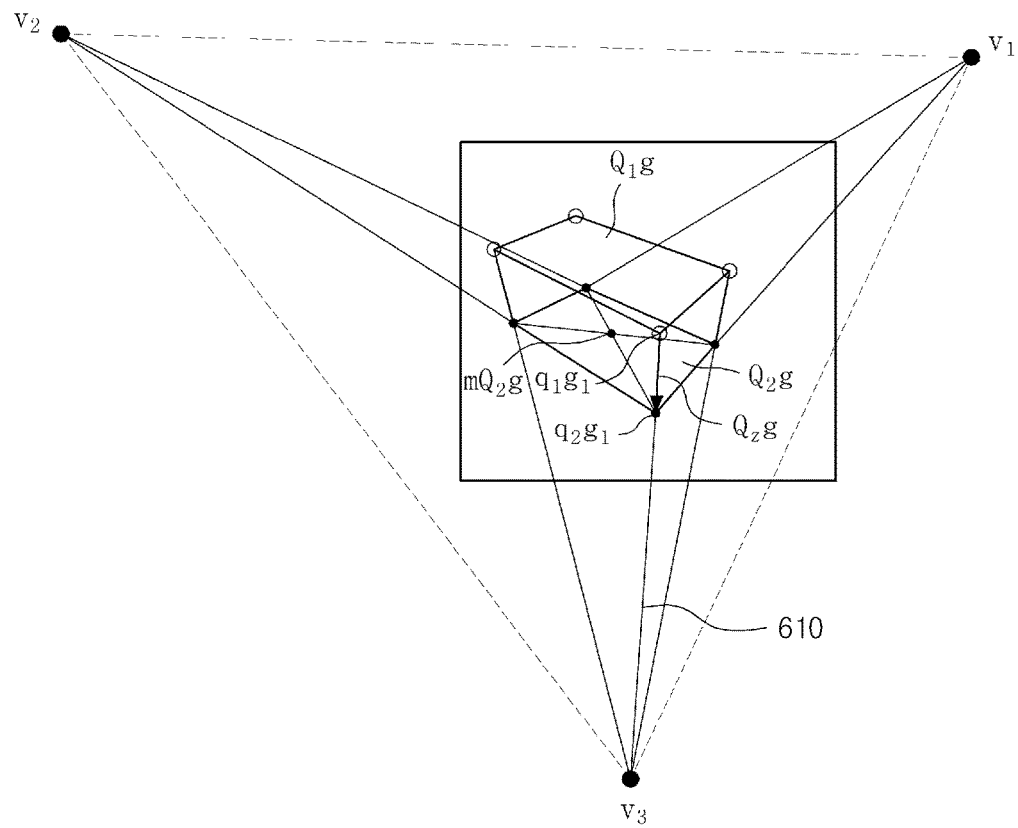
FIG. 6 illustrates an image depth computed by the apparatus for restoring a cubical object in accordance with an embodiment of the present invention.
Figure 7:
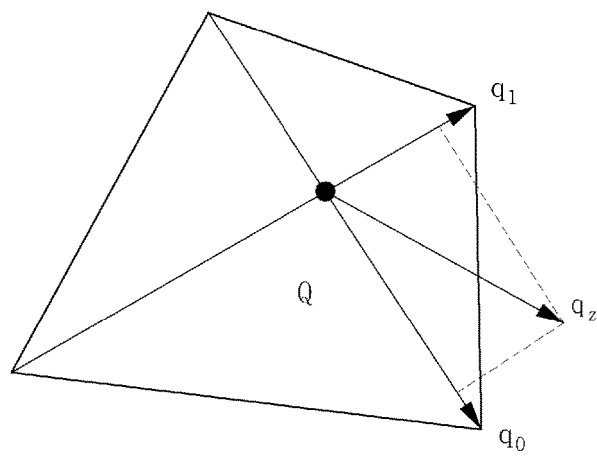
FIG. 7 illustrates how the apparatus for restoring a cubical object in accordance with an embodiment of the present invention disintegrates the image depth.
Figure 8:
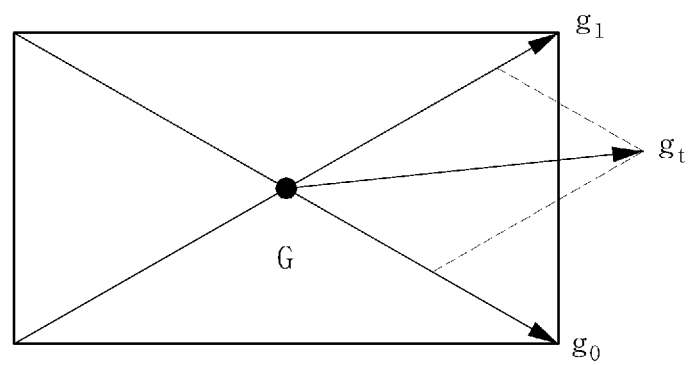
FIG. 8 illustrates how the apparatus for restoring a cubical object in accordance with an embodiment of the present invention computes a depth of a restored rectangle.
Figure 9:
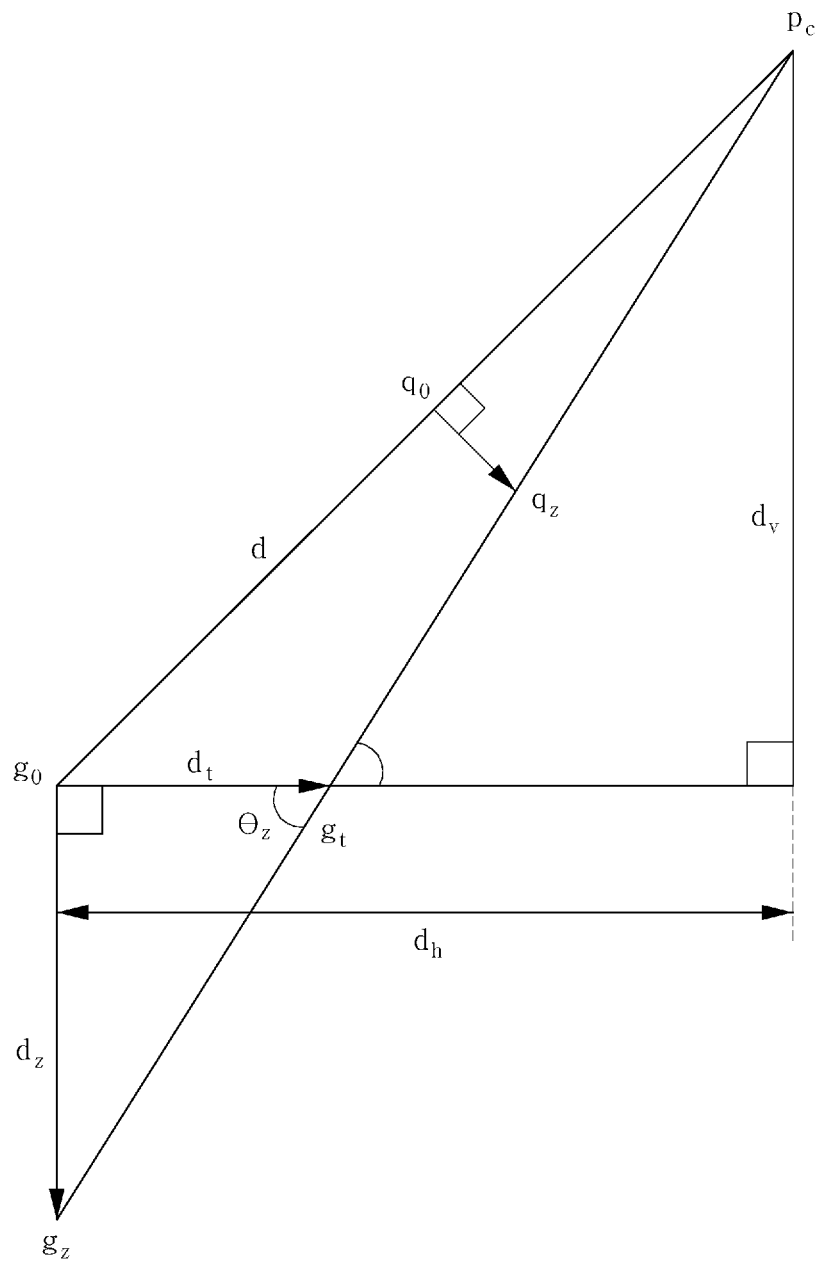
FIG. 9 illustrates how the apparatus for restoring a cubical object in accordance with an embodiment of the present invention computes a restored cubical object depth.

FIG. 2 illustrates how the apparatus for restoring a cubical object in accordance with an embodiment of the present invention restores a cubical object. FIG. 3 illustrates a representative rectangle of a cubical object selected by the apparatus for restoring a cubical object in accordance with an embodiment of the present invention. FIG. 4 illustrates how the apparatus for restoring a cubical object in accordance with an embodiment of the present invention computes two vanishing points. FIG. 5 illustrates how the apparatus for restoring a cubical object in accordance with an embodiment of the present invention computes a third vanishing point using the two vanishing points. FIG. 6 illustrates an image depth computed by the apparatus for restoring a cubical object in accordance with an embodiment of the present invention. FIG. 7 illustrates how the apparatus for restoring a cubical object in accordance with an embodiment of the present invention disintegrates the image depth. FIG. 8 illustrates how the apparatus for restoring a cubical object in accordance with an embodiment of the present invention computes a depth of a restored rectangle. FIG. 9 illustrates how the apparatus for restoring a cubical object in accordance with an embodiment of the present invention computes a restored cubical object depth.

Although the steps described hereinafter are carried out by various functional unit constituting the apparatus for restoring a cubical object, it will be collectively regarded that the respective steps are performed by the apparatus for restoring a cubical object, for the convenience of clear and concise description of the invention.

Referring to FIG. 2, in step 210, the apparatus for restoring a cubical object receives an image from an external device (e.g., a camera, a storage medium, a terminal, etc.).

In step 220, the apparatus for restoring a cubical object selects a surface having the best visibility among surfaces of a cubical object in the image and designates the surface as a representative rectangle. Here, the surface having the best visibility selected by the apparatus for restoring a cubical object may be a surface of the cubical object in the image in which sides thereof form at least a predetermined angle so as to make positions of four vertices thereof clearly distinguishable and a direction of a normal vector thereof is within a predetermined angle with a direction in which the camera has photographed the image. Alternatively, the apparatus for restoring a cubical object may have four vertices selected in the image by a user and select the rectangle formed by the four vertices as the representative rectangle. Alternatively, the apparatus for restoring a cubical image may extract line segments of the cubical object in the image and extract intersection points of the line segments as vertices. Hereinafter, four vertices of the representative rectangle will be referred to as $q_1g_1$, $q_1g_2$, $q_1g_3$ and $q_1g_4$, respectively. Moreover, four vertices of a corresponding rectangle will be referred to as $q_2g_1$, $q_2g_2$, $q_2g_3$ and $q_2g_4$, respectively.

In step 230, the apparatus for restoring a cubical object computes vanishing points corresponding to the cubical object. As shown in FIG. 4, the vanishing points V1, V2 computed by the apparatus for restoring a cubical object may be points intersected by lines extended from opposite sides of the representative rectangle. Moreover, the apparatus for restoring a cubical object computes a line segment f3 that passes through a center point of the image and is perpendicular to a line segment connecting the two computed vanishing points V1, V2. That is, as shown in FIG. 5, the apparatus for restoring a cubical object may compute a vanishing point V3 by intersecting the line segment f3 with a line segment that is perpendicular to a line segment f2 passing through one earlier-computed vanishing point V2 and the center point of the image and passes through the other earlier-computed vanishing point V1. The apparatus for restoring a cubical object may compute the vanishing points V1, V2 by intersecting the extended lines of the opposite line segments of the representative rectangle and compute the vanishing point V3 as a remaining vertex other than the two vanishing points V1, V2 of a triangle of which two vertices are the two vanishing points V1, V2 and an orthocenter is the center point of the image.

In step 240, the apparatus for restoring a cubical object computes an image depth of the cubical object. That is, the image depth computed by the apparatus for restoring a cubical object may be a vector corresponding to a line segment connecting $q_1g_1$ and $q_2g_1$ in FIG. 6. For example, the apparatus for restoring a cubical object may display a guideline 610 connected from a vertex of the representative rectangle to the vanishing point V3 and receive an input of selecting $q_2g_1$ from a user. Alternatively, the apparatus for restoring a cubical object may compute the image depth automatically through a predetermined process. How the apparatus for restoring a cubical object computes the image depth automatically will be described later in detail with reference to FIG. 10 and FIG. 11.

In step 250, the apparatus for restoring a cubical object computes a central rectangle corresponding to the representative rectangle. How the apparatus for restoring a cubical object computes the central rectangle will be described later in detail with reference to FIG. 12.

In step 260, the apparatus for restoring a cubical object computes a restored rectangle, corresponding to the central rectangle, and a projection center point, using a coupled line camera (CLC) method. Here, the restored rectangle corresponding to the central rectangle refers to the shape of the representative rectangle when the representative rectangle of the cubical object to be restored is viewed from the front side thereof (i.e., viewed in the direction of a normal vector). That is, it is possible to display the shape of a rectangle shown when the representative rectangle of the restored rectangle is viewed from the front side thereof. The projection center point refers to the position of a camera having photographed the image.

In step 270, the apparatus for restoring a cubical object disintegrates the image depth into two diagonal vectors of the central rectangle. For example, as shown in FIG. 7, the image depth $q_z$ may be disintegrated into two vectors $s_0q_0$, $s_1q_1$ corresponding to directions of vectors $q_0$ and $q_1$. Here, $s_0$ and $s_1$ are real numbers. In other words, the image depth $q_z$ may be expressed with the following equation.

$$q_z = s_0q_0 + s_1q_1 \quad \text{[Equation 1]}$$

In step 280, the apparatus for restoring a cubical object converts the two diagonal vectors of the central rectangle into two diagonal vectors of the restored rectangle using the CLC property and computes a depth of the restored rectangle by adding the two converted vectors. Here, it is well known how the diagonal vectors of the central rectangle are converted into the diagonal vectors of the restored rectangle, and thus the detailed description thereof will not be provided herein.

For example, the apparatus for restoring a cubical object may convert two vectors corresponding to directions of vectors $q_0$ and $q_1$ shown in FIG. 7 into two vectors $t_0g_0$, $t_1g_1$ corresponding to directions of vectors $g_0$ and $g_1$ shown in FIG. 8, and compute a depth $g_t$ of the restored rectangle by adding the two vectors. Here, $t_0$ and $t_1$ are real numbers. In other words, the depth $g_t$ of the restored rectangle may be expressed with the following equation.

$$g_t = t_0g_0 + t_1g_1$$

$$d_t = |g_t| \quad \text{[Equation 2]}$$

In step 290, the apparatus for restoring a cubical object computes a restored cubical object depth according to geometric relations of the depth of the restored rectangle, the image depth and the projection center point. For example, the apparatus for restoring a cubical object may compute a scalar value $d_z$ of the restored cubical object depth, as expressed in the following equation, according to geometric relations of the position of the projection center point $P_c$, the depth of the restored rectangle and the image depth, as shown in FIG. 9. The apparatus for restoring a cubical object may compute a vector having a direction perpendicular to the restored rectangle and the scalar value $d_z$ as the restored cubical object depth.

$$\tan\theta = \frac{d_z}{d_t} = \frac{d_v}{d_h - d_t} \quad \text{[Equation 3]}$$

$$\therefore d_z = \frac{d_t d_v}{d_h - d_t} = |g_z|$$

Here, $d_z$ is the scalar value of the restored cubical object depth, $g_z$ the restored cubical object depth, $d_t$ a scalar value of the depth of the restored rectangle, $d_h$ a horizontal distance between one vertex of the restored rectangle and the projection center point, and $d_v$ a vertical distance between the one vertex of the restored rectangle and the projection center point.

In step 295, the apparatus for restoring a cubical object restores a cubical object having the restored rectangle as one surface thereof and having a depth of the restored cubical object depth.

Figure 10:
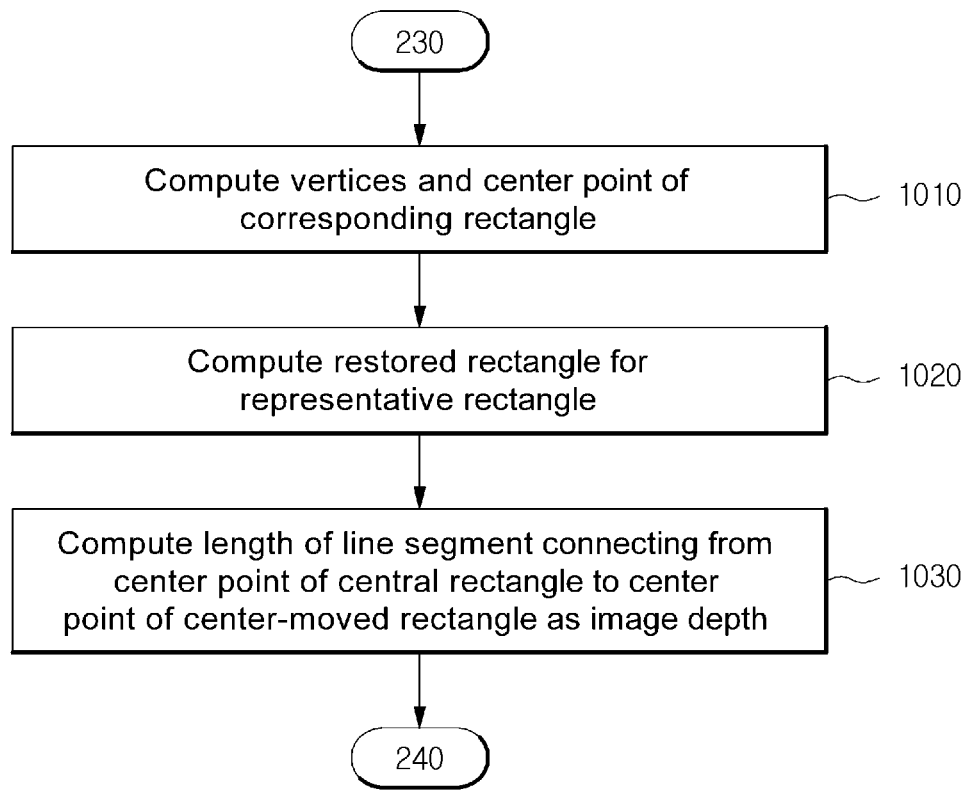
FIG. 10 is a flow diagram illustrating how the apparatus for restoring a cubical object in accordance with an embodiment of the present invention computes an image depth.
Figure 11:
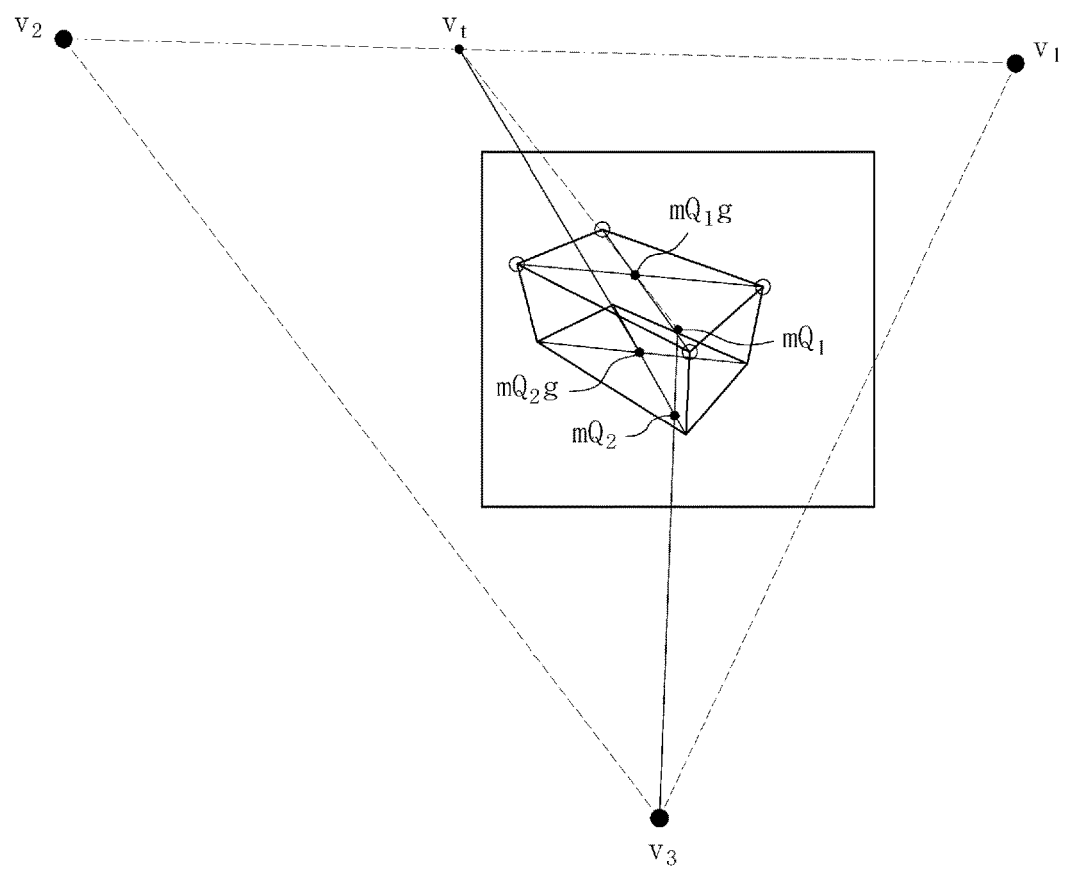
FIG. 11 illustrates how the apparatus for restoring a cubical object in accordance with an embodiment of the present invention computes a center point of a center-moved rectangle.

FIG. 10 is a flow diagram illustrating how the apparatus for restoring a cubical object in accordance with an embodiment of the present invention computes an image depth. FIG. 11 illustrates how the apparatus for restoring a cubical object in accordance with an embodiment of the present invention computes a center point of a center-moved rectangle. The step associated with FIG. 10 may correspond to step 240 described with reference to FIG. 2.

In step 1010, the apparatus for restoring a cubical object computes vertices and a center point of a corresponding rectangle. As the representative rectangle and the corresponding rectangle share 3 vanishing points, the apparatus for restoring a cubical object computes coordinates of the vertices of the corresponding rectangle. It is well known how the vertices of the corresponding rectangle are computed using 3 vanishing points, and thus the detailed description thereof will not be provided herein.

In step 1020, the apparatus for restoring a cubical object computes a center point of a rectangle (center-moved rectangle, hereinafter) facing opposite to the central rectangle in a cubical object containing the central rectangle, which is converted from the representative rectangle. As illustrated in FIG. 11, the apparatus for restoring a cubical object may configure a vanishing point $V_t$ (center vanishing point, hereinafter) at an intersection formed by a line extended through a center point $mQ_1g$ of the representative rectangle from a center point $mQ_1$ (center point of image) of the central rectangle and a line segment connecting two vanishing points V1, V2. The apparatus for restoring a cubical object may compute a center point $mQ_2$ of the center-moved rectangle by intersecting a line extended from the center vanishing point $V_t$ through a center point $mQ_2g$ of the corresponding rectangle and a line extended from the vanishing point V3 to the center point $mQ_1$ of the central rectangle.

In step 1030, the apparatus for restoring a cubical object computes a vector corresponding to a line segment connecting from the center point of the central rectangle to the center point of the center-moved rectangle as an image depth.

Figure 12:
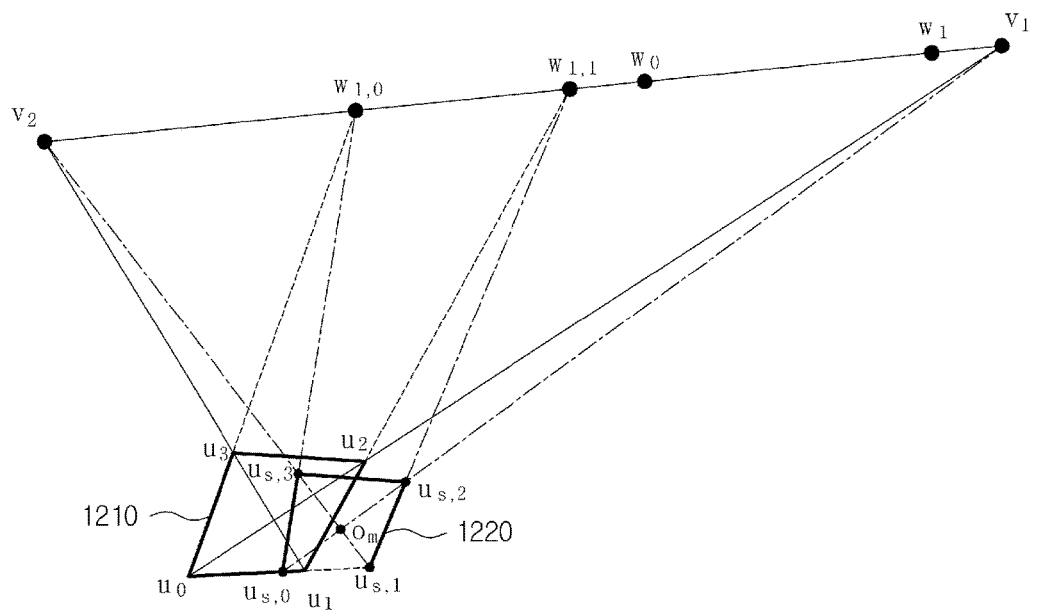
FIG. 12 illustrates how the apparatus for restoring a cubical object in accordance with an embodiment of the present invention computes a central rectangle.

FIG. 12 illustrates how the apparatus for restoring a cubical object in accordance with an embodiment of the present invention computes a central rectangle.

Referring to FIG. 12, the apparatus for restoring a cubical object may compute first extended intersection points $W_{1,0}$, $W_{1,1}$, which are points intersected by extended lines of sides of a representative rectangle 1210 and a line segment connecting two vanishing points V1, V2. The apparatus for restoring a cubical object may compute second extended intersection points $Us_{,0}$, $Us_{,1}$, which are points intersected by lines (center vanishing lines, hereinafter) extended from the vanishing points V1, V2 through a center point $O_m$ of the image and a line extended from one side (i.e., a side connecting $U_0$ and $U_1$) of the representative rectangle 1210. The apparatus for restoring a cubical object may compute third extended intersection points $Us_{,2}$, $Us_{,3}$, which are points intersected by lines connecting the first extended intersection points $W_{1,0}$, $W_{1,1}$ and the second extended extension points $Us_{,0}$, $Us_{,1}$ and the center vanishing lines. The apparatus for restoring a cubical object may compute a central rectangle 1220 by selecting the second extended extension points $Us_{,0}$, $Us_{,1}$ and the third extended intersection points $Us_{,2}$, $Us_{,3}$ as vertices thereof.

The apparatus for restoring a cubical object in accordance with an embodiment of the present invention described above may be realized in a computer system.

Figure 13:
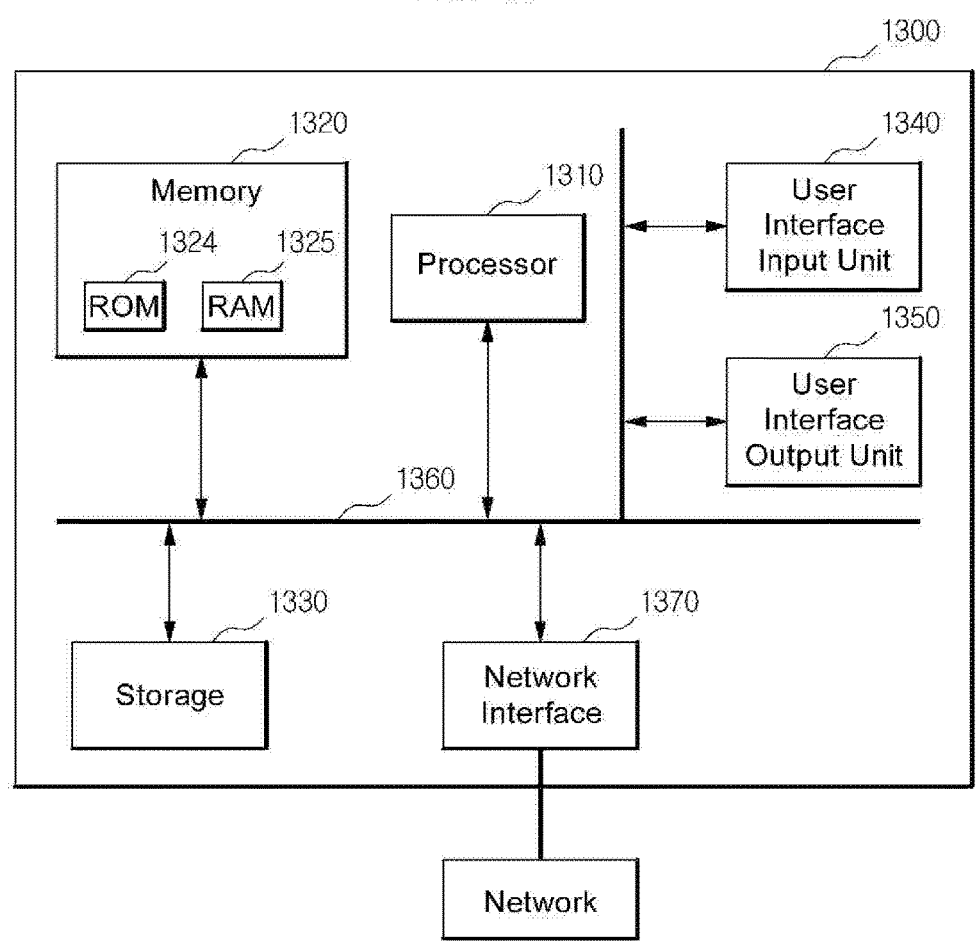
FIG. 13 illustrates a computer system in which the apparatus for restoring a cubical object in accordance with an embodiment of the present invention is realized.

FIG. 13 illustrates a computer system in which the apparatus for restoring a cubical object in accordance with an embodiment of the present invention is realized.

Referring to FIG. 13, an embodiment of the present invention may be realized in a computer system, for example, as a computer-readable recording medium. As illustrated in FIG. 13, a computer system 1300 may include at least one of elements consisting of a processor 1310, a memory 1320, a storage 1330, a user interface input unit 130 and a user interface output unit 1350, which are communicable with one another through a bus 1360. Moreover, the computer system 1300 may further include a network interface 1370 for accessing a network. The processor 1310 may be a CPU or a semiconductor device for running process instructions stored in the memory 1320 and/or storage 1330. The memory 1320 and the storage 1330 may include various types of volatile/non-volatile memory media. For example, the memory 1320 may include ROM 1324 and RAM 1325.

Hitherto, a certain embodiment of the present invention has been described, and it shall be appreciated that a large number of permutations and modifications of the present invention are possible without departing from the intrinsic features of the present invention by those who are ordinarily skilled in the art to which the present invention pertains. Accordingly, the disclosed embodiment of the present invention shall be appreciated in illustrative perspectives, rather than in restrictive perspectives, and the scope of the technical ideas of the present invention shall not be restricted by the disclosed embodiment. The scope of protection of the present invention shall be interpreted through the claims appended below, and any and all equivalent technical ideas shall be interpreted to be included in the claims of the present invention.

What is claimed is:

1. An apparatus for restoring a cubical object, comprising:
a vanishing point computing part configured to compute vanishing points corresponding to an image;
an image depth computing part configured to compute an image depth of a cubical object in the image;
a central rectangle computing part configured to compute a central rectangle based on a representative rectangle of the image and the vanishing points;
a restored rectangle computing part configured to compute a restored rectangle corresponding to the central rectangle and a projection center point using a coupled line camera (CLC) method;
a cube depth computing part configured to compute a restored cubical object depth based on the central rectangle, the restored rectangle and the projection center point; and
a cube restoring part configured to restore the cubical object to the image to thereby form a restored cubical object in the image, the restored cubical object having the restored rectangle as one surface thereof and having a depth of the restored cubical object depth,
wherein the cube depth computing part is configured for:
disintegrating the image depth into two diagonal vectors of the central rectangle;
converting the two diagonal vectors into two diagonal vectors of the restored rectangle;
computing a depth of the restored rectangle by adding the two diagonal vectors of the restored rectangle with each other; and
computing a restored cubical object depth based on the depth of the restored rectangle and the projection center point.

2. The apparatus of claim 1, wherein the vanishing point computing part is configured for:
computing first vanishing points by intersecting lines extended from sides of the representative rectangle facing opposite to each other;
computing a first line segment passing through a center point of the image and being perpendicular to a line segment connecting the first vanishing points with each other;
computing a second line segment being perpendicular to a line segment extended from one of the first vanishing points through the center point and passing through the other of the first vanishing points; and
computing a second vanishing point by intersecting the first line segment and the second line segment.

3. The apparatus of claim 2, wherein the image depth computing part is configured for:
computing a center point of a center-moved rectangle facing opposite to the central rectangle in a cubical object containing the central rectangle;
computing a center vanishing point by intersecting a line extended through a center point of the representative rectangle from a center point of the central rectangle and a line segment connecting the first vanishing points;
computing a center point of the center-moved rectangle by intersecting a line extended from the center vanishing point through a center point of a corresponding rectangle, which faces opposite to the representative rectangle, and a line extended from the second vanishing point to the center point of the central rectangle; and
computing a vector corresponding to a line segment connecting from the center point of the central rectangle to the center point of the center-moved rectangle as an image depth.

4. The apparatus of claim 1, wherein the cube depth computing part is configured to compute a scalar value of the restored cubical object depth using the following equation and to generate the restored cubical object depth being perpendicular to the restored rectangle and having the scalar value, $$\tan\theta = \frac{d_z}{d_t} = \frac{d_v}{d_h - d_t}$$

-continued $$\therefore d_z = \frac{d_t d_v}{d_h - d_t} = |g_z|$$

whereas $d_z$, is the scalar value of restored cubical object depth, $g_z$ being the restored cubical object depth, $d_t$ being a scalar value of the restored rectangle, $d_h$ being a horizontal distance between one vertex of the restored rectangle and the projection center point, and $d_v$ being a vertical distance between the one vertex of the restored rectangle and the projection center point.

5. A method of restoring a cubical object performed by an apparatus for restoring a cubical object, the method comprising:

computing vanishing points corresponding to an image;

computing an image depth of a cubical object in the image;

computing a central rectangle based on a representative rectangle of the image and the vanishing points;

computing a restored rectangle corresponding to the central rectangle and a projection center point using a coupled line camera (CLC) method;

computing a restored cubical object depth based on the central rectangle, the restored rectangle and the projection center point; and restoring the cubical object to the image to thereby form a restored cubical object in the image, the restored cubical object having the restored rectangle as one surface thereof and having a depth of the restored cubical object, wherein the step of computing the restored cubical object depth based on the central rectangle, the restored rectangle and the projection center point comprises:

disintegrating the image depth into two diagonal vectors of the central rectangle;

converting the two diagonal vectors into two diagonal vectors of the restored rectangle;

computing a depth of the restored rectangle by adding the two diagonal vectors of the restored rectangle with each other; and computing a restored cubical object depth based on the depth of the restored rectangle and the projection center point.

6. The method of claim 5, wherein the step of computing the vanishing points corresponding to the image comprises:

computing first vanishing points by intersecting lines extended from sides of the representative rectangle facing opposite to each other;

computing a first line segment passing through a center point of the image and being perpendicular to a line segment connecting the first vanishing points with each other;

computing a second line segment being perpendicular to a line segment extended from one of the first vanishing points through the center point and passing through the other of the first vanishing points; and computing a second vanishing point by intersecting the first line segment and the second line segment.

7. The method of claim 6, wherein the step of computing the image depth of the cubical object in the image comprises:

computing a center point of a center-moved rectangle facing opposite to the central rectangle in a cubical object containing the central rectangle;

computing a center vanishing point by intersecting a line extended through a center point of the representative rectangle from a center point of the central rectangle and a line segment connecting the first vanishing points;

computing a center point of the center-moved rectangle by intersecting a line extended from the center vanishing point through a center point of a corresponding rectangle, which faces opposite to the representative rectangle, and a line extended from the second vanishing point to the center point of the central rectangle; and computing a vector corresponding to a line segment connecting from the center point of the central rectangle to the center point of the center-moved rectangle as an image depth.

8. The method of claim 5, wherein the step of computing the restored cubical object depth based on the depth of the restored rectangle and the projection center point comprises:

computing a scalar value of the restored cubical object depth using the following equation and generating the restored cubical object depth being perpendicular to the restored rectangle and having the scalar value, $$\tan\theta = \frac{d_z}{d_t} = \frac{d_v}{d_h - d_t}$$

$$\therefore d_z = \frac{d_t d_v}{d_h - d_t} = |g_z|$$

whereas $d_z$, is the scalar value of restored cubical object depth, $g_z$ being the restored cubical object depth, $d_t$ being a scalar value of the restored rectangle, $d_h$ being a horizontal distance between one vertex of the restored rectangle and the projection center point, and $d_v$ being a vertical distance between the one vertex of the restored rectangle and the projection center point.

* * * * *